(12) United States Patent
Ganachaud et al.

(10) Patent No.: US 7,168,466 B2
(45) Date of Patent: Jan. 30, 2007

(54) SAFETY SYSTEM FOR LIQUID FUEL TANK

(75) Inventors: Patrick Ganachaud, Laval (FR); Jacques Covet, Gennes sur Glaize (FR)

(73) Assignee: Inergy Automotive Systems Research, Brussels (BE)

( * ) Notice: Subject to any disclaimer, the term of this patent is extended or adjusted under 35 U.S.C. 154(b) by 59 days.

(21) Appl. No.: 10/527,323

(22) PCT Filed: Sep. 12, 2003

(86) PCT No.: PCT/EP03/10191

§ 371 (c)(1),
(2), (4) Date: May 25, 2005

(87) PCT Pub. No.: WO2004/024487

PCT Pub. Date: Mar. 25, 2004

(65) Prior Publication Data

US 2005/0205156 A1    Sep. 22, 2005

(30) Foreign Application Priority Data

Sep. 13, 2002   (FR) .................................. 02 11466

(51) Int. Cl.
*B65B 1/04* (2006.01)
(52) U.S. Cl. ...................... 141/286; 141/350; 220/86.2
(58) Field of Classification Search ................ 141/286, 141/301, 302, 350, 349; 220/86.2
See application file for complete search history.

(56) References Cited

U.S. PATENT DOCUMENTS

| 2,548,734 | A |   | 4/1951  | Mathey |
|-----------|---|---|---------|--------|
| 4,874,020 | A | * | 10/1989 | Bucci ............................ 141/59 |
| 5,183,087 | A |   | 2/1993  | Aubel et al. |
| 5,282,497 | A | * | 2/1994  | Allison ......................... 141/59 |
| 5,740,842 | A |   | 4/1998  | Maier et al. |
| 2004/0144443 | A1 | | 7/2004 | Ganachaud |

FOREIGN PATENT DOCUMENTS

| EP | 0 026 727 | 4/1981 |
| EP | 0 921 026 | 6/1996 |
| FR | 952 137   | 11/1949 |
| FR | 2 458 418 | 1/1981 |

* cited by examiner

*Primary Examiner*—Steven O. Douglas
(74) *Attorney, Agent, or Firm*—Oblon, Spivak, McClelland, Maier & Neustadt, P.C (57) ABSTRACT

Fuel safety system, made of plastic, comprising a liquid fuel tank equipped with a fill tube provided with a guide for a delivery nozzle, which includes a sealing device, a normally-open float valve, for degassing and venting the tank, and a vapour breather pipe that also fixes the maximum level of liquid in the tank, the pipe connecting the top of this tank to a point located downstream of the sealing device and being completely located inside both the tank and the fill tube.

11 Claims, 6 Drawing Sheets

SAFETY SYSTEM FOR LIQUID FUEL TANK

The present invention relates to a safety system for liquid fuel tanks.

Many safety systems relating to fuel tanks have been described and aimed generally at solving the problems associated with degassing the tank when it is being filled, also of venting it during normal periods when the engine is at rest and when it is running and consuming this fuel. Added to these problems is the increasingly important requirement, with a view to respecting the environment, of recovering the vapour released during the abovementioned operations while minimizing any escape into the atmosphere.

It is known from U.S. Pat. No. 5,183,087 to degas a fuel tank provided with a fill tube, with a degassing and venting valve connected to a canister and with a small-diameter pipe connecting the upper portion of the tank to a guide located at the inlet of the fill tube, and which has the function of causing the supply of fuel via the nozzle to be shut off. This guide is provided with a sealing device and the pipe terminates downstream of the sealing device. In this system, the degassing is carried out exclusively by the valve connected to the canister. This valve is normally closed in the rest position and opens only under the effect of a certain pressure in the tank.

However, the known systems have a number of disadvantages:
difficult control of the overpressure in the tank, which results in inadvertent splashing and spillages during filling;
system poorly suited to vapour recovery via the nozzle; and
impossibility of causing the fuel supply via the nozzle to be shut off for an overfill of less than 0.2 l.

The object of the invention is to remedy the drawbacks of the known systems and to provide a system that allows:
filling without pressure in the tank;
elimination of fuel spillages and splashing;
standardization of the height of the fill tube for the different types of fuel and types of vapour recovery methods;
reduced size of the system;
elimination of the valves for preventing backflow and overfilling;
elimination of a blast of vapour being generated when venting, by dispensing with heavy ball valve systems; and
a low cost, of the same order of magnitude or less than that of conventional systems existing at the present time.

For this purpose, the invention relates to a safety system for a liquid fuel tank, comprising:
a) a fill tube terminating in a tank, the inlet orifice of the tube including a guide for a nozzle provided with a sealing device for sealing against the external environment;
b) a valve, mounted on the tank, capable of degassing the tank during an operation of filling with fuel, and also of venting during periods when the tank is in normal use; and
c) a vapour breather pipe that also fixes the maximum level of liquid fuel in the tank, according to which system the pipe emerges at one of its ends in the top of the tank, connects this top to the upper portion of the fill tube and emerges at its other end, at a point located downstream of the sealing device, on the side facing the tank, this pipe being completely located inside both the tank and the fill tube.

The invention applies to a safety system for a fuel tank, that is to say a system that allows the fuel to be stored and used in a manner that is safe both for the user and for the environment. Such a system protects the user from any hazardous situation, in particular risks of any explosion, implosion, combustion or pollution whatsoever, while precluding the leakage of liquid or emanation of undesirable gases into the external environment.

The tank to which the system according to the invention applies consists of a closed chamber, of various shapes, generally sealed with respect to the outside, which tank may be equipped with various internal accessories or accessories that pass through the wall of the chamber. The tank may contain any type of liquid fuel. In particular, it may contain fuel for supplying internal combustion engines of motor vehicles and, in particular, petrol and diesel. By extension, it may also contain any organic liquid that can be used as fuel and/or oxidizer for supplying a fuel cell intended to generate an electrical current, for the purpose of supplying one or more engines that consume this type of energy.

The system according to the invention may be made of any suitable material used for producing a liquid fuel system. Examples of these materials are various metals and plastics. A system according to the invention may also comprise more than one particular material.

Preferably, the safety system according to the invention is made of plastic. The term "plastic" is understood to mean any material comprising at least one synthetic resin polymer.

All types of plastic may be suitable. Plastics that are very suitable belong to the category of thermoplastics.

The term "thermoplastic" denotes any thermoplastic polymer, including thermoplastic elastomers, and also blends thereof. The term "polymer" denotes both homopolymers and copolymers (especially binary or ternary copolymers). Non-limiting examples of such copolymers are: random copolymers, linear block copolymers, other block copolymers, and graft copolymers.

Any type of thermoplastic polymer or copolymer whose melting point is below the decomposition temperature is suitable. Synthetic thermoplastics, which have a melting range spread over at least 10 degrees Celsius, are particularly suitable. Examples of such materials include those that exhibit polydispersion in their molecular weight.

In particular, polyolefins, polyvinyl halides, thermoplastic polyesters, polyketones, polyamides and copolymers thereof may be used. A blend of polymers or copolymers may also be used, likewise a blend of polymeric materials, with inorganic, organic and/or natural fillers such as, for example, but not exclusively: carbon, salts and other inorganic derivatives, natural fibres, glass fibres and polymeric fibres. It is also possible to use multilayer structures consisting of stacked layers bonded together, which include at least one of the polymers or copolymers described above.

Polyvinyl halides and polyolefins are generally preferred.

A polymer often employed is polyethylene. Excellent results have been obtained with high-density polyethylene (HDPE).

The fill tube of the system according to the invention has the function of allowing the tank to be filled, without the leakage of liquid, from a point that does not lie in the immediate vicinity of the tank. For example, it is common in the case of private motor vehicles for the fuel tank to be located at a point that is relatively inaccessible and is connected via a fill tube to an inlet orifice, which can be closed off by a cap, located at an easily accessible point on the body of the vehicle.

According to the invention, the fill tube is provided, at its inlet orifice, with a guide for a fill nozzle fitted with a device for sealing with respect to the external environment.

The nozzle is that with which service station pumps intended for supplying fuel, especially for motor vehicles, are equipped.

According to the invention, the guide is provided with a device for sealing with respect to the external environment. This sealing device is capable of isolating the internal atmosphere of the tank and that of the fill tube from the ambient atmosphere, even when the nozzle is inserted into the tube and passes through the said guide. The term "isolate" is understood here to mean that only a slight leak is permitted when using the tank. The permissible leak level is set when the sealing device is being fitted, so that, under a test pressure of 40 mbar relative to atmospheric pressure, the leak does not exceed 20 1/hour, and preferably does not exceed 12 1/hour.

The operation of filling a tank with a liquid fuel is necessarily accompanied by an increase in the internal pressure in the tank. When the latter includes a degassing circuit, the slight overpressure caused by the liquid newly introduced into the tank tends to be eliminated thanks to the escape of a similar volume of gas that occupied the tank. In the case of volatile liquids, the gas that escapes will be a more or less homogeneous mixture of the gas present in the tank before filling and of vapour coming from the partial vaporization of the liquid introduced.

Moreover, in normal use of the tank, the liquid fuel volume decreases as fuel is more or less regularly and/or continuously drawn off. It is therefore necessary to provide and equip the tanks with devices allowing air intake so as to compensate for the loss of liquid during operation and thus prevent the creation of a vacuum in the tank and the dangers inherent in this situation.

To try to guard against such risks, the role of the valve fitted on the tank, both of these in accordance with the system according to the invention, is that of a safety valve, that is to say one capable of venting the tank or, in other words, capable of allowing it to be opened in a programmed manner so as to carry out two different functions, namely degassing when filling the tank and venting the latter during normal use when the fuel that it contains is either being consumed or left in the tank when stored for a certain period.

The system according to the invention also includes a vapour breather pipe that also fixes the maximum level of liquid fuel in the tank during filling. According to the invention, this pipe is completely located both inside the volume bounded by the tank and the fill tube.

The breather/maximum-level-fixing pipe connects the top of the tank to the upper portion of the fill tube and is capable of removing most (and preferably all) of the volume of gas present in the tank, that is to say it has a diameter sufficient to allow the gas to escape without creating a substantial overpressure inside the tank.

This pipe emerges at one of its ends in the top of the tank at a level corresponding to the maximum permitted upper level of the fuel in the tank when full. At its other end, the pipe emerges at a point located downstream of the device for sealing the nozzle guide present at the top of the fill tube. The term "downstream" should be understood here to mean on that side of the sealing device located towards the tank.

The breather/maximum-level-fixing pipe may emerge directly in the top of the tank. Alternatively, it may also emerge in this top via a float valve, different from the degassing/venting valve. In the latter case, the flow of vapour takes place through the open valve and the float is designed to close off the passage when the maximum liquid level is reached in the tank.

In the particular case in which the fill tube is connected to the tank at a low point of the latter, the breather pipe, which also fixes the maximum level of liquid fuel, generally takes the form of a siphon placed inside the tank. In this situation, it is advantageous for this pipe to be divided into two parts, the first located in the tank and the second in the fill tube. The two parts join at the point where the fill tube joins the tank, also called the neck. It is particularly advantageous for a non-return valve to be placed in the neck, which prevents any backflow of liquid into the fill tube. This non-return valve includes receptacles for fixing the two parts of the breather/maximum-level-fixing pipe. Advantageously, the presence of such a non-return valve prevents the pipe from moving both inside the tube and the tank.

Preferably, the degassing/venting valve of the safety system for a liquid fuel tank according to the invention is a float valve, that is to say a movable device that can slide in a shaft, which follows the fuel level present in the tank as soon as this level reaches a low rest position of the float in the shaft. Such a valve is a device which, in collaboration with the other components of the safety system, helps to maintain the tank on which it is mounted in a safe state for the user, that is to say the user is protected from any hazardous situation, in particular the risks of any explosion, implosion, combustion or pollution whatsoever, while still protecting the external environment from any undesirable gas emanation or liquid leak.

It is advantageous for this float valve to remain open, in normal situations, both during the operation of filling the tank and during the periods of normal use of the latter, when this tank is closed and the fuel is either being consumed or left in the tank for a certain storage period.

The float line of the float of such a valve is set so that the valve is closed only in two circumstances. The first of these occurs when the tank is inclined beyond a predetermined limit, or even is completely upside down. The second occurs during a transient movement of the fuel, the amplitude of which exceeds a certain predetermined value.

An example of a float valve that is very suitable for the system according to the invention is that which has two chambers, one having a float and the other a volume acting as a container capable of trapping the liquid fuel entrained by the vapour escaping from the valve. Such a valve is described in French Patent Application No. 2000/09286.

In this embodiment, the safety system described above is suitable for the various types of geographical situation and/or of fuel-delivery nozzles that are encountered in service stations.

For example, it is well suited to the practice in North America whereby the fuel vapour is recovered in a large-volume canister filled with a hydrocarbon-absorbent material.

It is also particularly well suited to the removal and recovery of fuel vapour via what are called "active" nozzles, that is to say those that themselves suck up the vapour in order to store and/or recover it away from the vehicles with the safety system. The vapour breather/maximum-level-fixing pipe preferably has a diameter sufficient to allow all of the gas present in the tank to be sucked up by the nozzle in this case. Such systems may be found mainly in Europe.

The sealing device for the safety system according to the invention may be made of any material capable of ensuring that there is proper sealing between the tank and the external environment, including when the spout of a fuel nozzle has passed through it. The term "sealing" is understood to mean here as accepting a slight leak, of the order of magnitude of that described above in the situation when the nozzle has been inserted into the guide.

One particular embodiment of the safety system according to the invention that has given good results is that in which the sealing device comprises an annular seal. Preferably, this annular seal has at least one lip made of elastomer, which folds around the outer surface of the nozzle spout pipe. A device having two annular lips has given good results.

A preferred variant of the particular embodiment of the above safety system is that in which the sealing device furthermore includes, downstream of the annular lip, a stopper that can open under the effect of the pressure caused by contact with the end of the nozzle.

One possible embodiment of the stopper is a flat circular part made of elastomer, which is slit in the form of a star from its centre along a number of radii, which define lamellae in the form of circular sectors, which nevertheless ensure gastightness when they are in the closed rest position, one against the other. A stopper comprising 4 lamellae in quarters has given excellent results. The term "sealing" again has the same meaning as above here.

The stopper may be integral with the sealing system so as to form a single component comprising the lip and the stopper. It may also constitute a member that cooperates with the lip of the sealing system but is independent of the latter. Another possible example of such a stopper is a metal or rigid plastic flap, similar to the known stoppers, held in the closed position by a spring, the opening of the flap being controlled by pressure exerted on its surface by the end of the nozzle. The term "rigid plastic" is understood here to mean a plastic that is not elastic.

In another particular embodiment of the safety system according to the invention, which may be combined with the previous one, this system furthermore includes a safety valve which can open only towards the external atmosphere in the event of excessive overpressure in the tank. This safety valve brings the inside of the fill tube into communication with the atmosphere external to the tank, creating a passage that allows liquid and/or gas inside the tube to escape towards this external atmosphere in the vicinity of the nozzle.

This valve has the function of preventing the tank from bursting in extreme abnormal situations, such as a rapid and high temperature rise, in the event of a fire or explosion for example, and also in the event of failure of the nozzle's automatic tripping system.

The safety valve may be produced as any appropriate means. One very suitable means is that of an annular lip made of elastomer that extends the sealing device upstream, on the side of the inlet orifice of the tube.

Advantageously, the annular lip has one of its ends fastened to the sealing device, the other end bearing with an elastic force on a rigid element bordering the passage. The term "rigid" has the same meaning as that already explained above. In the open position, the lip exposes an orifice, which allows the liquid and/or gas to flow in an initial direction perpendicular to the axis of the delivery nozzle.

Alternatively, the safety valve may also consist of a non-return valve independent of the sealing system and located in the guide for the nozzle, near the latter. One example of such a valve is a diaphragm valve in which the diaphragm has the shape of an umbrella which is placed in an orifice made in the guide, near the nozzle.

In another advantageous embodiment of the safety system according to the invention, which may be combined with those already described, the breather/level-fixing pipe is made of an electrically conductive material and is connected via an electrical conductor to a metal earth, for example that of a vehicle on which the tank is mounted. According to this embodiment, the pipe can be made completely of an electrically conductive material. It may also have only an external surface layer made of a conductive material. An example of a suitable conductive material is a plastic filled with carbon black.

A first variant of the system according to the invention, which may be combined with all the embodiments described above, is well suited to nozzles provided with fuel vapour suction devices, also called "active" nozzles. In this first variant, one outlet of the valve is connected, on one side, to a canister filled with a material that absorbs the fuel vapour, and a vapour degassing pipe connects, on the other hand, a second outlet of the valve to the upper portion of the fill tube, upstream of the sealing device of the guide at a point close to the suction device of the nozzle. This degassing pipe is capable of removing most (and preferably all) of the volume of gas escaping from the tank during an operation filling the latter.

This system is very suitable in the case in which the tank is intended for storing fuel of high volatility. In particular, it is advantageous when the active nozzle is of the type provided with a suction device having a sleeve capable of surrounding the upper orifice of the tube via which the filling takes place. This type of nozzle may be found more often in Europe than in North America.

The term "fuel of high volatility" is understood to mean light fuels, such as various types of petrol, to the exclusion of heavier oils, such as gas oil or another fuel for diesel engines.

The outlets of the valve in question are, on the one hand, the gas outlet of the venting circuit, for venting during the periods of normal operation, and, on the other hand, the gas outlet of the degassing circuit, for degassing during filling. The latter outlet may, for example, be located at the gas outlet of the container for trapping the entrained liquid fuel, when such a container is installed in the valve used.

The expression "capable of removing most and preferably all of the gas" has the same meaning as that explained above in the case of the breather pipe.

In the case of nozzles that are not provided with a fuel vapour suction system, a second variant of the system according to the invention includes a valve which, as in the case of the first variant, is connected to a canister filled with a material that absorbs the fuel vapour. However, in the particular case of this second variant, the valve is not provided with a second outlet and the volume of the canister, the size of the valve and the diameter of the pipe connecting the valve to the canister are designed so that the latter is capable of retaining by itself most of the volume of gas escaping from the tank during the filling operation. In this situation, in addition to absorbing the gas when venting the tank in normal use, the canister also absorbs the gas leaving the tank at the moment of filling. This system is very suitable for the case in which the tank is intended for storing fuels of high volatility. This situation may be found mainly in North America.

A third variant of the system according to the invention, very suitable for nozzles not provided with fuel vapour suction systems, comprises a valve whose outlet emerges in a canister filled with a material that absorbs the fuel vapour. This system may be suitable in the case in which the tank is intended for storing fuels of high volatility. In this case, there is generally only one outlet of the valve, which may be connected to an additional vapour absorption device, for example a second canister, place in series with the first, the function of which is to retain the fuel vapour each time the first canister is saturated. This system may be found both in Europe and in North America.

For fuels of low volatility and nozzles not provided with fuel vapour suction systems, a fourth variant, as an alternative to the third variant, is one whereby the outlet of the valve emerges in the atmosphere without passing via a canister. This variant is more particularly suitable for European systems. The outlet to atmosphere may be a direct outlet on the valve itself. It may also pass through a device that prevents the ingress of solid particles into the tank or via any other suitable device, such as any discharge circuit or pipe whatsoever.

In a fifth variant of the system according to the invention, in accordance with the third and fourth variants, a vapour degassing pipe connects a second outlet of the valve to the upper portion of the fill tube, upstream of the device for sealing the guide, at a point close to a suction device on the nozzle, and it is capable of removing most of the volume of gas escaping from the tank during an operation of filling the latter.

The meanings of the terms "sealing" and "upstream" and of the expression "capable of removing most of the volume of gas escaping from the tank" again are here the same as those explained above.

FIGS. 1 to 6 that follow have the purpose of illustrating the invention, without in any way limiting its scope.

Figure 1:
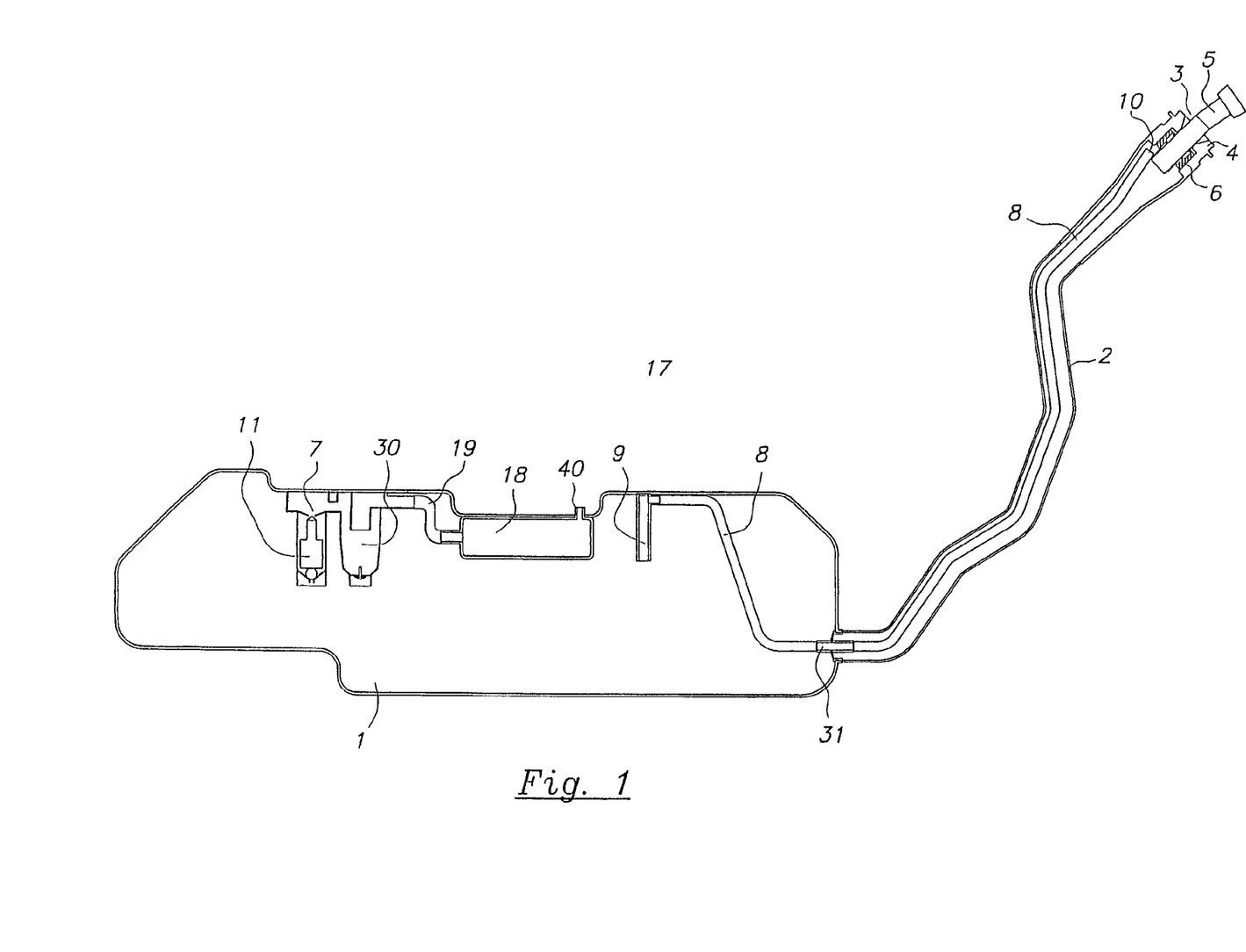
FIG. 1 illustrates schematically a safety system for a liquid fuel tank in a version suitable for European countries.

In this figure, a tank (1) made of high-density polyethylene (HDPE), containing liquid fuel (95 octane lead-free petrol), was provided with an HDPE fill tube (2), with a degassing/venting valve (7) which includes a float (11) and a liquid trapping container (30) connected via the HDPE pipe (19) to a canister (18) filled with active carbon and via a pipe (40) to the external atmosphere (17). A vapour breather/maximum-level-fixing pipe (8) connected the overhead of the tank (1) to a region (10) of the tube (2), this region being located immediately downstream of a sealing device (6). This sealing device (6) comprised a flexible seal having two lips. The pipe (8) was located entirely inside the volume of the tube (2) and inside the tank (1) and was immersed in the overhead of the tank (1) via a vertical portion (9) to a level which fixed the maximum level of liquid fuel permitted in the tank. The pipe (8) was divided into two parts separated by a non-return valve (31) placed in the neck of the tank (1), at the point where it joins the tube (2), and prevented liquid from escaping from the tank (1), especially prevented this tank from draining in the event of the tank/fill tube connection fracturing. FIG. 1 also shows a guide (4) for the service station delivery nozzle (5) engaged in the top of the tube (2) and passing through the sealing device (6) in such a way that the end of the delivery spout is located downstream of said sealing device.

The operation of the system shown in FIG. 1 is explained in detail below. Starting from the initial situation in which the tank (1) was closed off by a closure cap (not shown) on the fill tube (2) and the tank was in a normal rest situation, no amount of fuel being drawn off, the cap closing off the inlet (3) of the fill tube (2) was opened so as to carry out an operation of refuelling with petrol.

The nozzle (5) was then inserted into the inlet (3) of the guide (4) and was mechanically forced to penetrate through the seals of the sealing device (6). This nozzle (5) had, at the end of its spout, inserted into the tube (2) downstream of the seal of the sealing device (6), an inlet orifice serving as a sensor for cutting off the inflow of fuel. Thanks to the seals of the sealing device (6), the ambient air could no longer reach the orifice of the triggering system of the nozzle (5).

The handle for opening the nozzle (5) was then operated by the user and petrol started to be delivered into the tank (1). So that the nozzle (5) does not trip and cut off the inflow of petrol, air and/or petrol vapour could freely enter via the top of the vapour breather/maximum-level-fixing pipe (8) in the region (10) downstream of the sealing device (6), that portion (9) of the pipe (8) being immersed in the top of the tank (1), the gas pocket lying above the liquid fuel level in the tank (1), the valve (7), the degassing pipe (40) and the atmosphere external to the tank (1) close to the inlet (3).

At the same time, the volume of petrol introduced via the tube (2) has replaced the volume of gas present in the gas pocket of the tank (1). This volume of gas escaped, as explained above, via the valve (7) and the degassing pipe (40).

Leaving the pipe (41) of the valve (7) was a venturi device which introduced a certain head loss into the connection between the valve (7) and the canister (18), so as to allow to pass through to the canister only a small quantity of gas, substantially less than that flowing in the pipes (8) and (40). This arrangement made it possible for the active carbon filling the canister (18) not to be unnecessarily saturated during the filling operation.

During filling, the overpressure inside the tank (1) with respect to the atmospheric pressure remained very low and determined only by the low head-loss characteristics of the open passages of the valve (7) and of the degassing pipe (40).

The petrol level in the tank rose and ended up being flush with the orifice of the pipe (9). At this moment, the nozzle (5) no longer received air or gas coming from the pocket lying above the petrol level in the tank (1) and the inlet orifice of the spout of the nozzle (5) was subjected to a slight underpressure, thereby activating the automatic underpressure-sensitive device on this nozzle (5) and causing the inflow of petrol to be cut off.

Figure 2A:
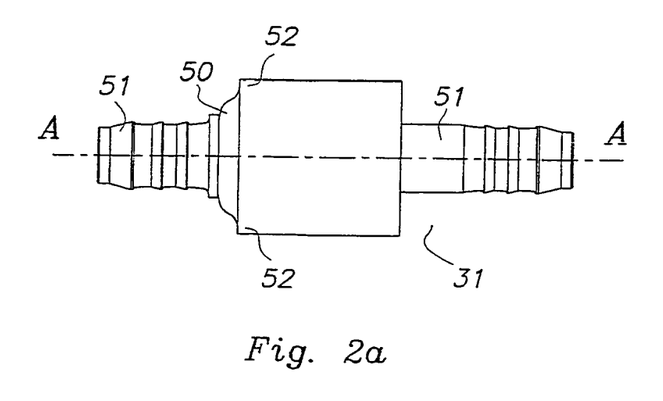
Figure 2B:
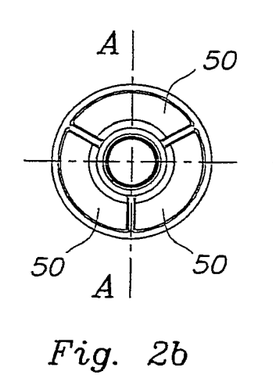
Figure 2C:
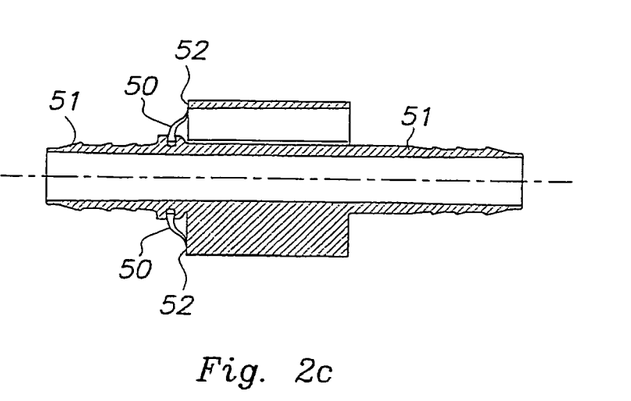

FIG. 2 illustrates in detail a non-return valve (31), divided into three subfigures 2a, 2b and 2c. Subfigure 2a is a plan view of this valve. Subfigure 2b is an end view and subfigure 2c is a sectional view on the axis AA. This shows an annular lip (50) made of a soft flexible material, one end of which was fastened to a tube (51), the two parts of the pipe (8) being joined to the ends of the said tube (51). This lip (50) could deform under the pressure of a liquid coming from the tube (2) so as to allow this liquid to enter the tank (1). However, the liquid present in the tank (1) was prevented from returning to the tube (2) as it exerted a pressure on the lip (50) and kept it pressed against the base (52) of the non-return valve (31).

Figure 3:
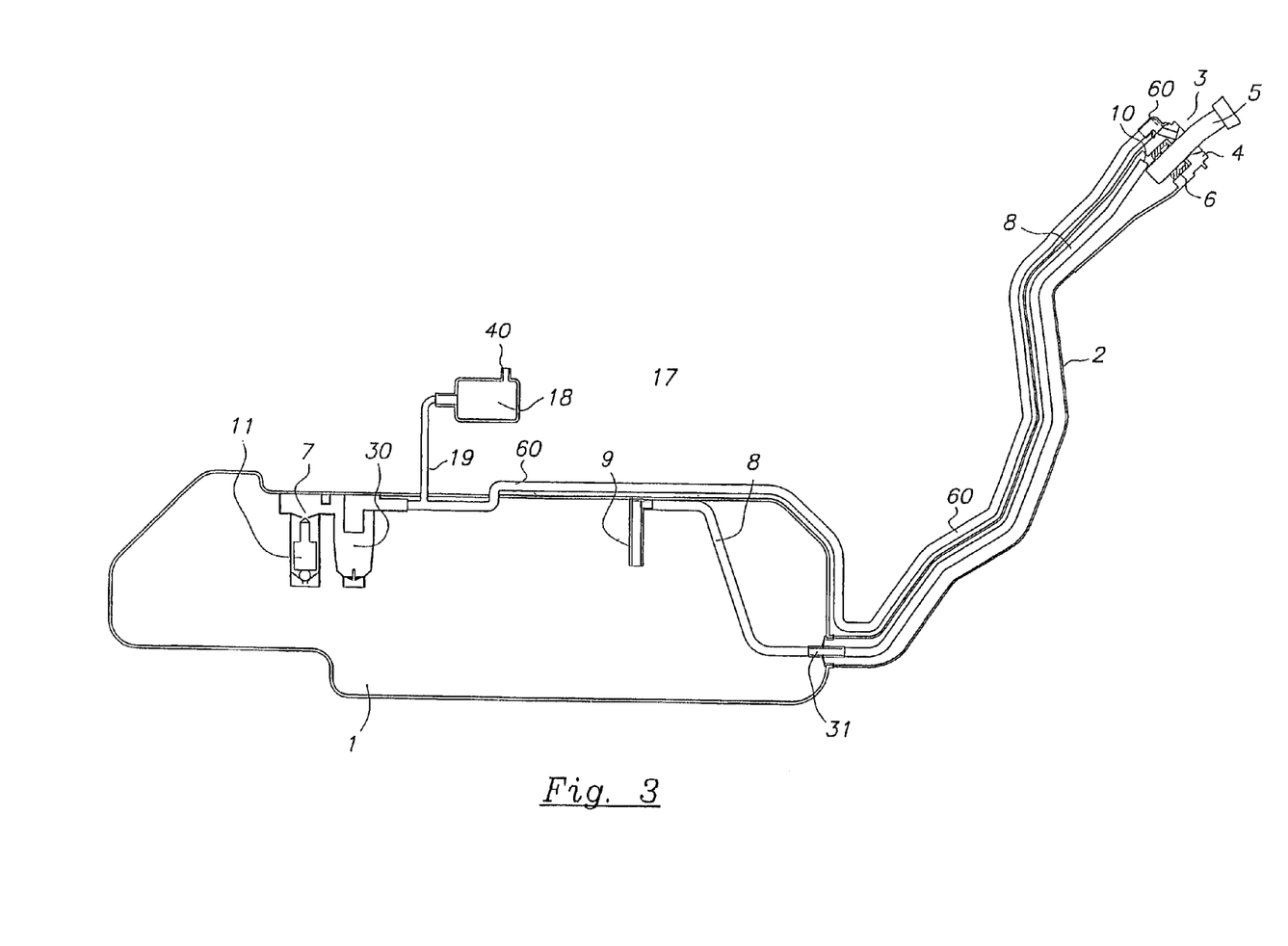

FIG. 3 illustrates a variant of FIG. 1, that is to say a safety system for a liquid fuel tank in a version suitable for European countries. In this figure, a degassing/venting valve (7), including a liquid trapping container (30), was connected via the pipe (19) to a canister (18) filled with active carbon, placed outside the tank (1), and via a degassing pipe (60) to the upper orifice (3) of the fill tube (2). The pipe (60) ensured degassing during the period of filling the tank (1).

Since the valve (7) remained open, the very slight overpressure present in the tank during filling was balanced by the atmospheric pressure via the degassing pipe (60) and the outlet (3). After the orifice of the tube (2) was closed off by the closure cap, the pressure in the tank continued to be balanced via the pipe (19) and the canister (18).

During filling, the gas discharging into the atmosphere at the inlet (3) of the tube was sucked up by means of an active system comprising a sleeve (not shown), surrounding the top of the nozzle (5) and the inlet (3), and connected to a suction pump of the service station where the gas was collected.

Figure 4:
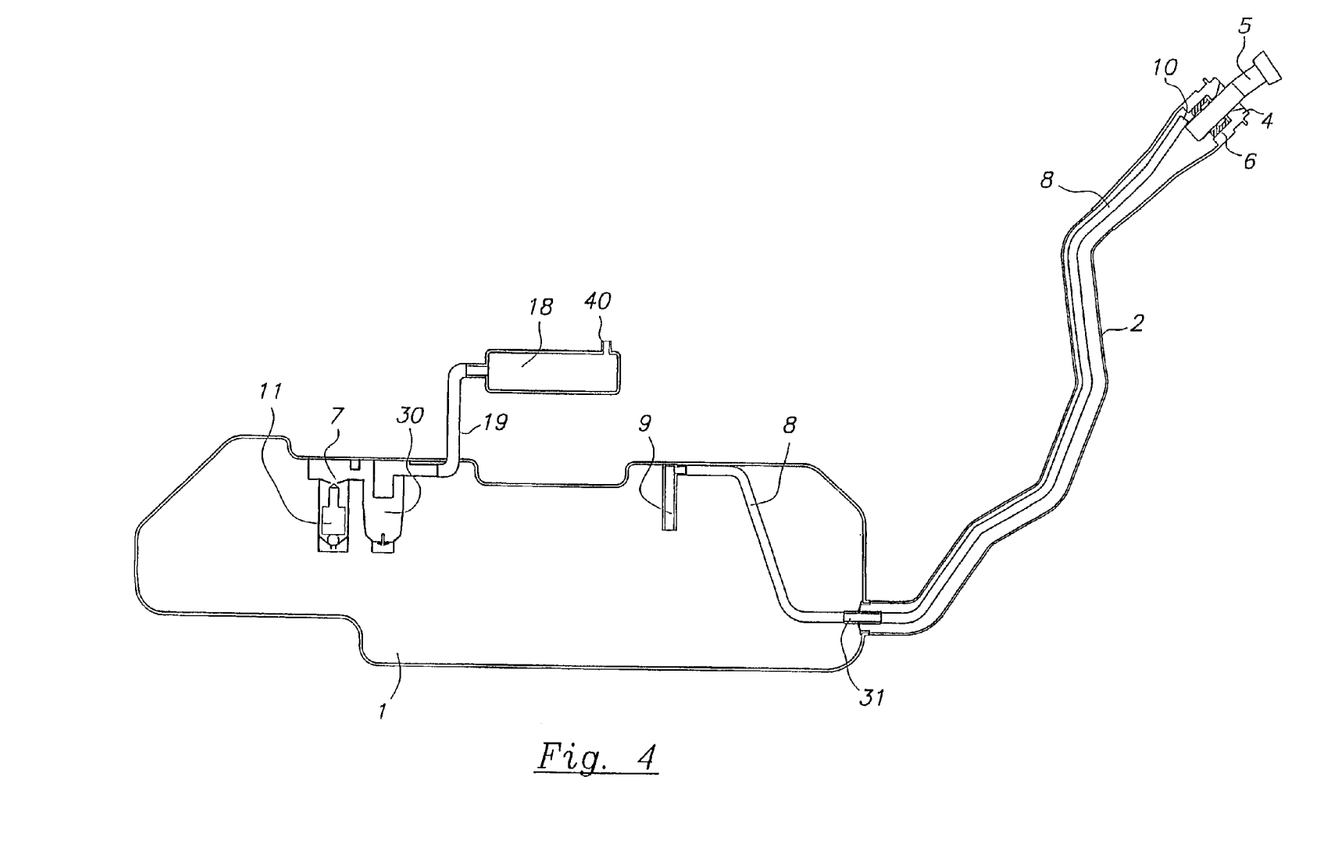

FIG. 4 illustrates schematically a safety system for a liquid fuel tank in a version suitable for North America.

In this figure, an HDPE tank (1), containing liquid fuel (95 octane lead-free petrol), was provided with an HDPE fill tube (2), with a degassing/venting valve (7) which includes a float valve (11) and a liquid trapping container (30) connected via the pipe (19) to a large canister (18) filled with active carbon, external to the tank (1). A vapour breather/maximum-level-fixing pipe (8), made of HDPE, connects the overhead of the tank (1) to a region (10) of the tube (2), this region being located immediately downstream of a sealing device (6). This sealing device (6) comprised a flexible seal having two lips. The vapour breather/maximum-level-fixing pipe (8) was located entirely inside the volume of the tube (2) and inside the tank (1) and was immersed in the overhead of the tank (1) via a vertical portion (9) to a level which fixed the maximum level of liquid fuel permitted in the tank. The pipe (8) was divided into two parts separated by a non-return valve (31) placed in the neck of the tank (1), at the point where it joins the tube (2), and prevented liquid from escaping from the tank (1). FIG. 4 also shows a service station nozzle (5) for delivering fuel, engaged in the top of the tube (2) and passing through the sealing device (6) in such a way that the end of the delivery spout is located downstream of the sealing seal (6).

The operation of the safety device of FIG. 4 is explained in detail as follows. Starting from the initial situation in which the tank (1) was closed off by a closure cap on the fill tube (2) and the tank was in a normal rest situation, no amount of fuel being drawn off, the cap closing off the inlet (3) of the fill tube (2) was opened so as to carry out an operation of refuelling with petrol.

The nozzle (5) was then inserted into the inlet (3) of the tube (2) and was mechanically forced so as to pass through the seals of the sealing device (6). This nozzle (5) had, at the end of its spout inserted into the tube (2) downstream of the seal of the sealing device (6), an inlet orifice serving as sensor for cutting off the inflow of fuel. Thanks to the seals of the sealing device (6), the ambient air could no longer reach the orifice of the triggering system of the nozzle (5).

The handle for opening the nozzle (5) was then operated by the user and petrol started to be delivered into the tank (1). So that the nozzle (5) does not trip and cut off the inflow of petrol, air and/or petrol vapour could freely enter via the top of the pipe (8) in the region (10) downstream of the sealing device (6), that portion (9) of the pipe (8) being immersed in the top of the tank (1), the gas pocket lying above the liquid fuel level in the tank (1), the valve (7), the pipe (19), the canister (18) and the outlet (40) to atmosphere.

At the same time, the volume of petrol introduced via the tube (2) has replaced the volume of gas present in the gas pocket of the tank (1). This volume of gas escaped, as explained above, via the valve (7) and the canister (18).

During filling, the overpressure inside the tank (1) with respect to the atmospheric pressure remained very low and determined only by the low head-loss characteristics of the open passages of the valve (7), of the pipe (19) and of the canister (18).

The vapour coming from the gas pocket lying above the level of liquid fuel in the tank (1) was discharged via the breather pipe (19) and absorbed in the large-capacity canister (18).

The petrol level in the tank rose and ended up being flush with the orifice of the breather pipe (9). At this moment, the nozzle (5) no longer received air or gas coming from the pocket lying above the petrol level in the tank (1) and the inlet orifice of the spout of the nozzle (5) was subjected to a slight underpressure, thereby activating the automatic underpressure-sensitive device on this nozzle (5) and causing the inflow of petrol to be cut off.

Since the valve (7) remained open, the very slight overpressure present in the tank during filling was balanced with the atmospheric pressure via the pipe (19) and the canister (18).

Figure 5:
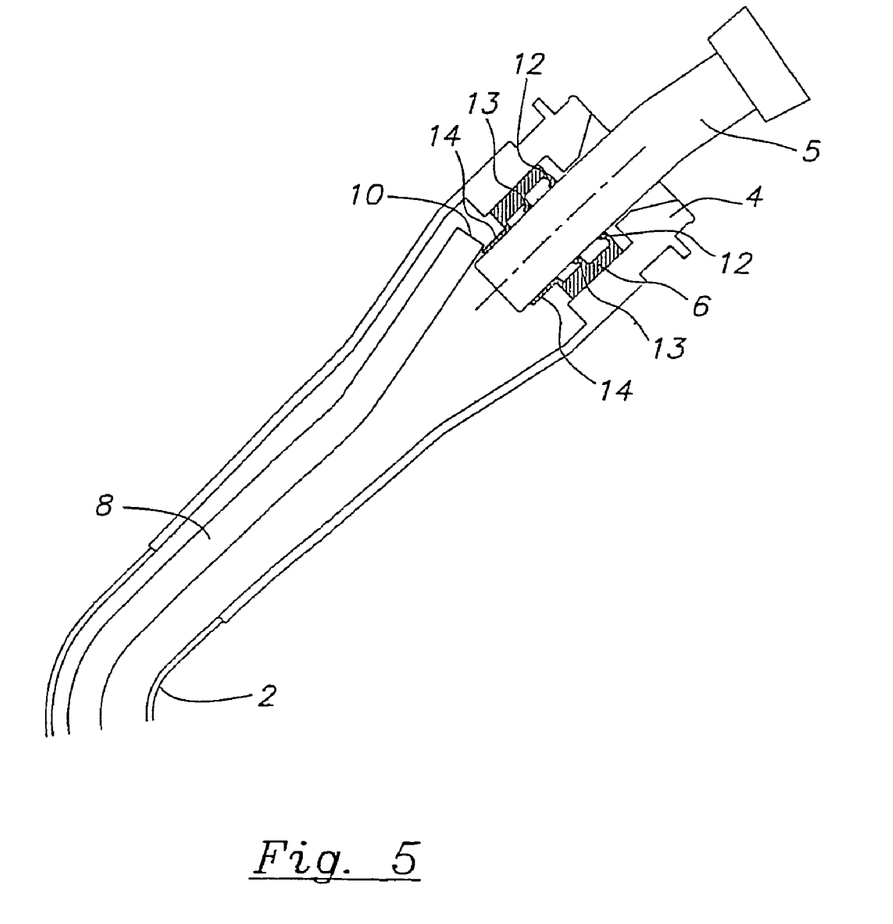

FIG. 5 illustrates in detail the top of a fill tube (2) according to FIGS. 1 and 4, in which the sealing device (6), provided with its seal in the form of two flexible lips (12, 13) and supplemented with the stopper (14), may be distinguished.

Figure 6:
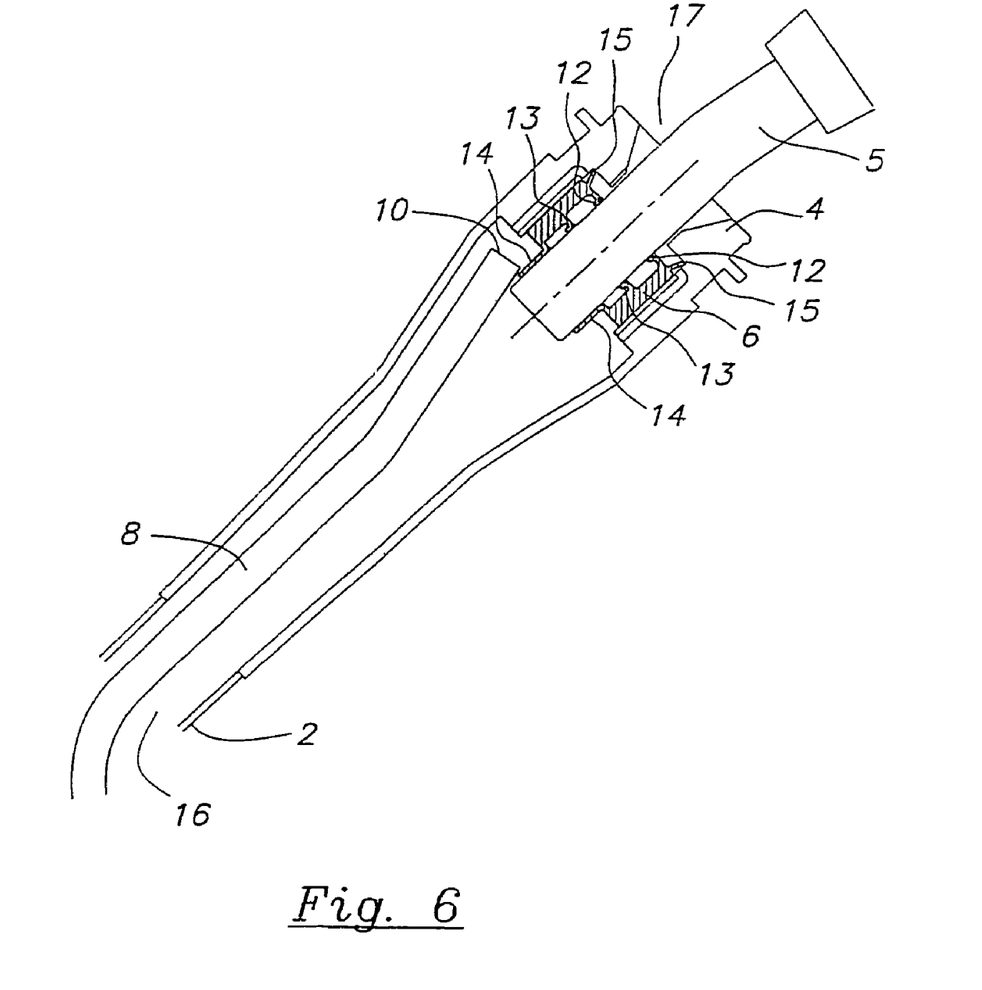

FIG. 6 illustrates a variant of the preceding figure, in which a safety valve (15) allows opening to the atmosphere (17) in the event of accidental excess overpressure when refuelling the tank (1) with fuel.

The invention claimed is:

1. A safety system for a liquid fuel tank, comprising:
   a) a fill tube terminating in a tank, the inlet orifice of the tube including a guide for a nozzle provided with a sealing device for sealing against the external environment;
   b) a valve, mounted on the tank, capable of degassing the tank during an operation of filling with fuel, and also of venting during periods when the tank is in normal use; and
   c) a vapour breather pipe that also fixes the maximum level of liquid fuel in the tank,
   wherein the pipe emerges at one of its ends in the top of the tank, connects this top to the upper portion of the fill tube and emerges at its other end, at a point located downstream of the sealing device, on the side facing the tank, and in which the pipe is completely located inside both the tank and the fill tube.

2. The system according to claim 1, wherein the pipe emerges in the top of the tank via a float valve.

3. The system according to claim 1, wherein the valve has a float, said valve being normally open when filling the tank and during the periods of normal use of the tank, and wherein the float line of the float is set so that the valve is closed only in two circumstances, namely when the tank is inclined beyond a predetermined limit, or even completely upside down, and during a transient movement of the fuel, the amplitude of which exceeds a predetermined value.

4. The system according to claim 1, wherein the sealing device comprises an annular seal having at least one circular lip made of a flexible elastomer and intended to bear on the circumference of the spout of the nozzle.

5. The system according to claim 4, wherein the sealing device furthermore includes, downstream of the lip, a stopper that can open under the effect of the pressure caused by contact with the end of the spout of the nozzle.

6. The system according to claim 1, which furthermore includes a safety valve which can open only towards the external atmosphere in the event of excessive overpressure in the tank and which brings the inside of the fill tube into communication with the external atmosphere in the vicinity of the nozzle.

7. The system according to claim 6, wherein the safety valve is an annular lip made of elastomer that extends the sealing device upstream, on the side facing the inlet orifice of the tube.

8. The system according to claim 6, wherein the safety valve is a non-return valve independent of the sealing system and located in the guide for the nozzle, near the latter.

9. The system according to claim 1, wherein at least one external surface layer of the pipe is electrically conductive and wherein this pipe is connected via an electrical conductor to a metal earth of a vehicle on which the tank is mounted.

10. The system according to claim 1, suited to nozzles that are not provided with fuel vapour suction systems, wherein the valve is connected to a canister filled with a material that absorbs the fuel vapour and wherein the volume of the canister, the size of the valve and the diameter of the pipe connecting the valve to the canister are designed so as to be capable of evacuating most of the volume of gas escaping from the tank during the filling operation.

11. The system according to claim 1, wherein the outlet of the valve emerges in the external atmosphere without passing via a canister.

* * * * *